United States Patent [19]

Sohn

[11] Patent Number: 5,892,555
[45] Date of Patent: Apr. 6, 1999

[54] VIDEO SIGNAL CLAMPING CIRCUIT

[75] Inventor: Ki Sung Sohn, Kyeungki-do, Rep. of Korea

[73] Assignee: LG Semicon Co., Ld., Chungcheongbuk-Do, Rep. of Korea

[21] Appl. No.: 671,302

[22] Filed: Jul. 1, 1996

[30] Foreign Application Priority Data

Jun. 30, 1995 [KR] Rep. of Korea ............ 95 18720

[51] Int. Cl.⁶ ............................. H04N 5/16; H04N 5/18
[52] U.S. Cl. .................... 348/689; 348/689; 348/690; 348/691; 348/692
[58] Field of Search ................... 348/689, 690, 348/691, 692, 695, 696, 697, 677; H04N 5/16, 5/18

[56] References Cited

U.S. PATENT DOCUMENTS

| | | | |
|---|---|---|---|
| 4,544,951 | 10/1985 | Yoshisato | 348/695 |
| 4,742,392 | 5/1988 | Hashimoto | 348/695 |
| 4,821,087 | 4/1989 | Honjo | 348/692 |
| 5,008,753 | 4/1991 | Kitaura | 348/695 |
| 5,087,973 | 2/1992 | Kawahara | 348/572 |
| 5,148,055 | 9/1992 | Nohara | 307/353 |
| 5,379,075 | 1/1995 | Nagasawa | 348/678 |

FOREIGN PATENT DOCUMENTS

| | | | |
|---|---|---|---|
| 0022763 | 1/1991 | Japan | H04N 5/18 |
| 0022764 | 1/1991 | Japan | H04N 5/18 |

*Primary Examiner*—John K. Peng
*Assistant Examiner*—Wesner Sajous
*Attorney, Agent, or Firm*—Loudermilk & Associates

[57] ABSTRACT

A video signal clamping circuit for maintaining a constant clamping output level is disclosed including a clamper for generating a clamping output level in response to a reference voltage by use of an external condenser receiving a video signal and a plurality of transistors, a level variation detector for sensing a variation the clamping output level of the clamper and generating a level variation signal corresponding to the variation in the clamping output level, and a reference voltage compensator connected to the level variation detector, for receiving the level variation signal and compensating for the reference voltage of the clamper.

16 Claims, 3 Drawing Sheets

VIDEO SIGNAL CLAMPING CIRCUIT

FIELD OF THE INVENTION

The present invention relates to video signal clamping circuits for maintaining a constant clamping level, and more particularly to clamping circuits for maintaining a constant peak level irrespective of variations in the peak level of an input video signal.

BACKGROUND OF THE INVENTION

Recently, developments in video signal input/output techniques for a variety of video media have been demanding a video screen of higher quality. A clamping circuit for fixing a peak value, such as a minimum or maximum value of an input signal, to a constant power source level is used primarily in cases in which a reference direct current (DC) level is lost due to distortion of the video signal or the input signal of a television, etc. Since a conventional video signal clamping circuit typically has a clamping level at an output terminal that varies with the peak level of an input video signal, the inconstant peak level acts an a unstable factor in reproducing the video signal.

FIG. 1 is a block diagram of such a conventional video signal clamping circuit. The circuit of FIG. 1 is constructed such that if a video signal is supplied, an output signal having a constant peak level is formed by external condenser 11 and clamper 10. FIG. 2 is a circuit diagram of the conventional clamping circuit of FIG. 1. Referring to FIGS. 1 and 2, transistors $Q_B$ and $Q_C$ have the same characteristics, and resistors $R_D$ and $R_E$ have the same resistance values. Since transistors $Q_B$ and $Q_C$ operate at the same base-to-emitter voltage $V_{BE}$, respective base currents flowing into the respective bases of transistors $Q_B$ and $Q_C$ are the same, and likewise, respective collector currents flowing into respective collectors thereof are the same, thereby forming a current mirror. One terminal of resistor $R_B$ is connected to the base and collector of transistor $Q_B$. The other terminal of resistor $R_B$ is connected to resistor $R_A$ and the base of transistor $Q_A$. The input video signal is transmitted to node N1 through external condenser (CB) 11. The emitter of transistor QD is connected to constant current source Is at output node N2 connected to output terminal VOUT.

In operation, since transistors $Q_B$ and $Q_C$ have a current mirror structure, if resistors $R_D$ and $R_E$ have the same resistance values, then the base currents of transistors $Q_B$ and $Q_C$ are the same, and the collector currents thereof are the same. Assuming that each collector current flowing into the collectors of the transistors $Q_B$ and $Q_C$ is $I_B$, $I_B$ can be represented by the following equation (1):

$$I_B = \frac{V_{CC} - V_{BE}(Q_B)}{R_A + R_B + R_D} \quad (1)$$

where $V_{BE}(Q_B)$ is the voltage between the base and emitter of transistor $Q_B$. Since elements $V_{CC}$, $V_{BE}(Q_B)$, $R_A$, $R_B$ and $R_D$ have constant values, current $I_B$ can be treated as a constant.

A voltage V1 across the base node of transistor $Q_A$ can be obtained by substituting Ohm's law (V=IR) for $I_B$ given from equation (1):

$$V1 = \frac{V_{CC} - V_{BE}(Q_B)}{R_A + R_B + R_D} \times (R_B + R_D) + V_{BE}(Q_B) \quad (2)$$

A voltage at node N1 directly connected to the input terminal is obtained by subtracting the base-to-emitter voltage $V_{BE}(Q_A)$ of transistor $Q_A$ from voltage V1 across the base node of transistor $Q_A$. That is:

$$V1 - V_{BE}(Q_A) \quad (3)$$

When there is no input signal, since the voltage at node N1 given from expression (3) is a voltage across the base of transistor $Q_D$, a voltage at output node N2 connected to the emitter of transistor $Q_D$ is obtained by adding $V_{BE}(Q_D)$ to $V1-V_{BE}(Q_A)$. That is, the output voltage is as follows:

$$V1 - V_{BE}(Q_A) + V_{BE}(Q_D) \quad (4)$$

FIG. 3 is a waveform chart illustrating an operation of the video signal clamping circuit of FIG. 2. A clamping voltage of the output terminal for the input video signal having a varied peak level varies by a varying difference.

If the input signal level received to the input terminal is lower than the voltage at node N1 connected to the input terminal, $$V_{IN} < V1 - V_{BE}(Q_A), \quad (5)$$

then the current of transistor $Q_A$ with the emitter connected to node N1 is increased and thus $V_{BE}(Q_A)$ is increased. The voltage level of $V1-V_{BE}(Q_A)$ of expression (3) is lowered. The peak level of the output signal is clamped to a voltage determined by equation (6). Since $V1-V_{BE}(Q_A)$ is lowered, the clamping level is lowered.

$$V_{OUT} = V1 - V_{BE}(Q_A) + V_{BE}(QD) \quad (6)$$

Therefore, if the peak level of the input video signal varies, then the conventional video signal clamping circuit reflects the varied peak level in the clamped output signal. Current $I_A$ is divided into $I_B$ and $I_C$ by node N1 connected to the input terminal as can be represented by the following equation (7):

$$I_A = I_B + I_C \quad (7)$$

If the peak level of the input video signal varies, then $I_C$ also varies. Since $I_B$ calculated by equation (1) can be treated as a constant, IA varies in proportion to $I_C$.

The base-to-emitter voltage $V_{BE}(Q_A)$ of transistor $Q_A$ is determined by emitter current $I_A$ of transistor $Q_A$. If $I_A$ varies, then $V_{BE}(Q_A)$ varies. Therefore, clamping level $V_{OUT}$ represented by equation (6) varies according to $V_{BE}(Q_A)$ since V1 and $V_{BE}(Q_A)$ have a constant value.

That is, the clamping level $V_{OUT}$ of the output terminal varies with $V_{BE}(Q_A)$, $V_{BE}(Q_A)$ varies with $I_A$, $I_A$ varies with $I_C$, and $I_C$ is proportional to a variation in the peak level of the input video signal. As a result, clamping level $V_{OUT}$ varies according to variations in the peak level of the input video signal. Hence, the desired results can not be obtained in reproducing the video signal.

SUMMARY OF THE INVENTION

It is an object of the present invention to provide video signal clamping circuits for maintaining a constant clamping level by sensing a variation in an output level and compensating with a reference voltage used in producing the clamped output signal.

In accordance with one aspect of the present invention, a video signal clamping circuit for maintaining a constant clamping output level includes a clamper for generating a clamped output level in response to a reference voltage by use of an external condenser receiving a video signal and a plurality of transistors, a level variation detector for sensing a variation in the clamped output level of the clamper and generating a level variation signal corresponding to the variation in the clamped output level, and a reference voltage compensator connected to the level variation detector for receiving the level variation signal and compensating for the reference voltage of the clamper.

The present invention will now be described more specifically with reference to the attached drawings.

BRIEF DESCRIPTION OF THE ATTACHED DRAWINGS

DETAILED DESCRIPTION OF PREFERRED EMBODIMENTS OF THE PRESENT INVENTION

Figure 1:
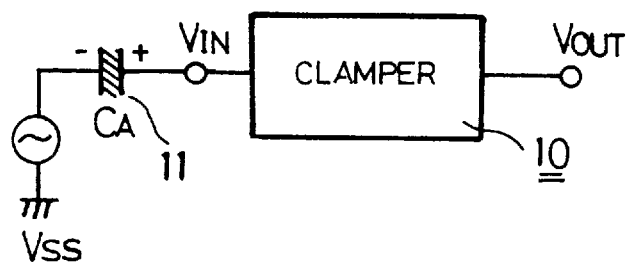
FIG. 1 is a block diagram of a conventional video signal clamping circuit.
Figure 2:
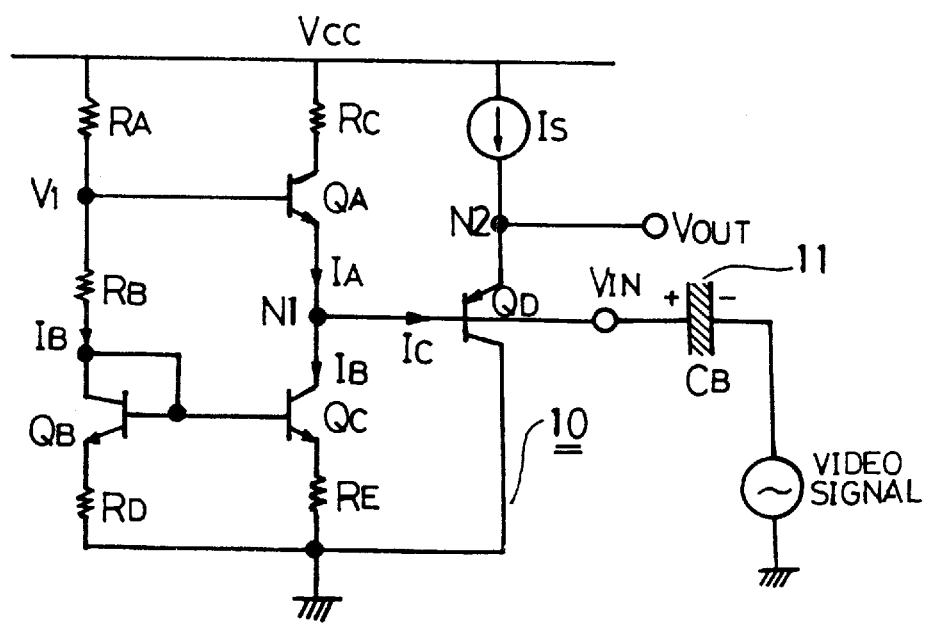
FIG. 2 is a circuit diagram of the conventional video signal clamping circuit.
Figure 3:
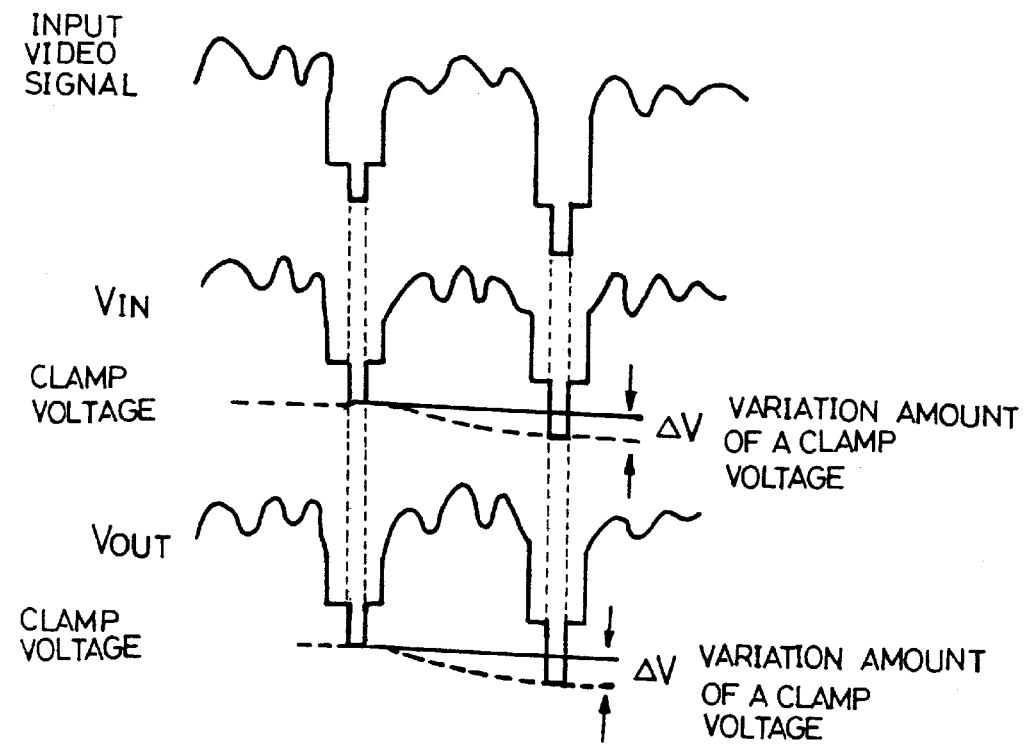
FIG. 3 is a waveform chart illustrating operation of the conventional video signal clamping circuit of FIG. 2.
Figure 4:
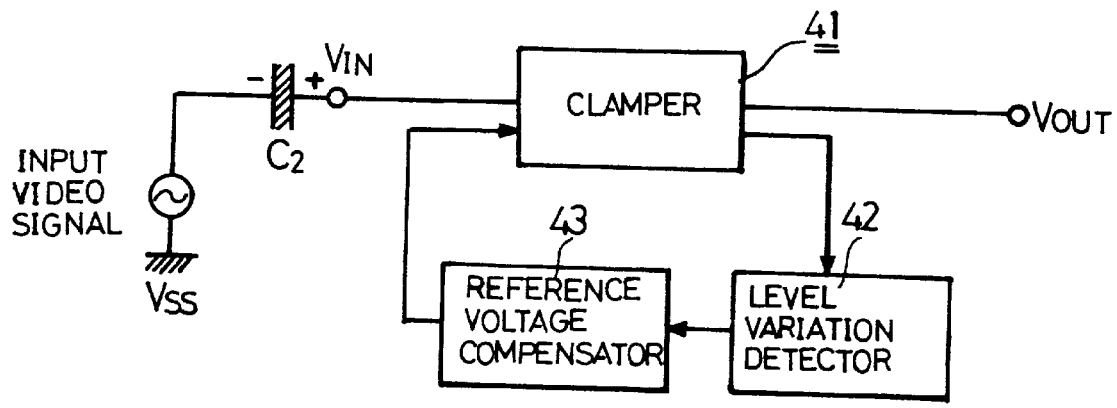
FIG. 4 is a block diagram of a video signal clamping circuit according to the present invention.
Figure 5:
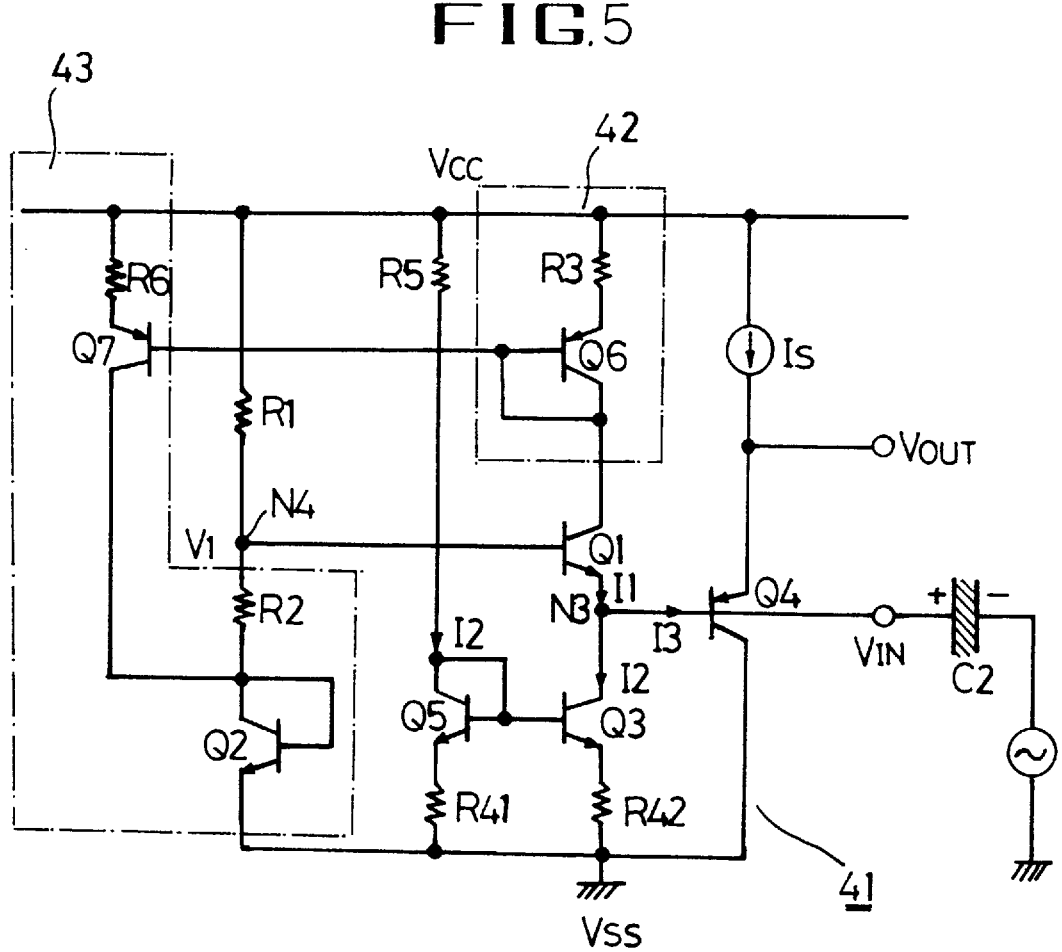
FIG. 5 is a circuit diagram of the video signal clamping circuit according to the present invention.

Referring to FIGS. 4 and 5, a video signal clamping circuit in accordance with the present invention includes clamper 41, level variation detector 42 and reference voltage compensator 43.

Clamper 41 has transistors Q1 and Q4 and a current mirror consisting of transistors Q3 and Q5. External condenser C2 has one terminal connected to receive a video signal. Transistor Q4 for generating a clamped voltage has its base connected to the other terminal of external condenser C2 and its emitter connected to constant current source Is. Transistors Q3 and Q5 ideally have the same characteristics. The collector of transistor Q5 and the bases of transistors Q3 and Q5 are commonly connected so as to have the same base-to-emitter voltage. Respective emitters of transistors Q3 and Q5 are connected to a ground voltage VSS through resistors R42 and R41, which ideally have the same resistance value. The collector of transistor Q5 is connected to power voltage VCC through resistor R5. Transistor Q1 has its emitter connected to the collector of transistor Q3 and to the base of transistor Q4, and its base connected to reference voltage generating node N4. If reference voltage V1 at reference voltage generating node N4 is constant, then clamper 41 generates a constant output level $V_{OUT}$.

Level variation detector 42 includes transistor Q6 with its collector and base connected to the collector of transistor Q1, and its emitter connected to power voltage VCC through resistor R3.

Level variation detector 42 senses a variation in the output level of clamper 41 and transmits a level variation signal to reference voltage compensator 43.

Reference voltage compensator 43 consisting of transistors Q2 and Q7 and resistors R2 and R6 receives the level variation signal from level variation detector 42 and compensates for reference voltage V1 of clamper 41. Transistor Q7 has its base connected to the base and collector of transistor Q6 of level variation detector 42, its emitter connected to power voltage VCC through resistor R6, and its collector connected to the base and collector of transistor Q2.

In operation, if there is no input signal, or if a peak level of the input signal is constant, the output level $V_{OUT}$ can be represented using expression (4) as follows:

$$V_{OUT} = V1 - V_{BE}(Q1) + V_{BE}(Q4) \tag{8}$$

where V1 can be expressed as:

$$V1 = R2 \times [VCC - V_{BE}(Q2)]/(R1+R2) + V_{BE}(Q2).$$

If the current of transistor Q2 is constant, voltage V1 is also constant. Since only a DC voltage is applied when there is no input signal, currents I1, I2 and I3 are constant, then and $V_{BE}(Q1)$ and $V_{BE}(Q4)$ are constant. Consequently, $V_{OUT}$ has a constant value.

If the peak level of the input video signal is lowered, the DC level across input node N3 is lowered. Then, current I3 flowing into the base of transistor Q4 is increased by $\Delta I$. That is, current of I3+$\Delta I$ flows into the base of transistor Q4. The current at input node N3 can be represented by:

$$I1 = I2 + I3 \tag{9}$$

where I2 is a fixed value.

If current I3 is increased by $\Delta I$, then current I1 is increased by $\Delta I$. That is, $$I1 + \Delta I = I2 + I3\ \Delta I \tag{10}$$

Current I1+$\Delta I$ is the current flowing into the emitter of transistor Q1. Since $\Delta I$ has an influence on the collector of transistor Q1, the collector current of transistor Q1 is increased in proportion to $\Delta I$. Since the collector current of Q1 is the same as, or otherwise corresponds to, the currents flowing into the collector and base of transistor Q6, the collector and base currents of transistor Q6 are increased by $\Delta I$.

Transistors Q6 and Q7 form a current mirror like transistors Q3 and Q5. If the resistance values of resistors R3 and R6 are the same, then the base and collector currents of transistor Q7 are the same as those of transistor Q6, respectively. Increased current $\Delta I$ in the collector current of transistor Q6 has an effect on transistor Q7, increasing the collector current of transistor Q7 by $\Delta I$.

Since the collector of transistor Q7 is connected to the base and collector of transistor Q2, increased collector current $\Delta I$ of transistor Q7 increases the base and collector currents of transistor Q2. Consequently, increased current $\Delta I$ has an effect on the current flowing into transistor Q2.

A level variation in the video signal applied to input node N3 causes a current variation of transistor Q1 by $\Delta I$. This sequentially affects transistors Q6, Q7 and Q2. Hence, if the current of transistor Q1 is increased by $\Delta I$, then the current of transistor Q2 is also increased by $\Delta I$.

$$I_C = I_S \exp \frac{V_{BE}}{\frac{K_T}{Q}} \tag{11}$$

Since the exponential function is the inverse relation of the logarithmic function, equation (11), above, may be given by:

$$V_{BE} = \frac{K_T}{Q} \ln \frac{I_C}{I_S} \tag{12}$$

Since $K_T/Q$ is a constant and $I_S$ of the logarithmic function is also a constant, a variable which influences $V_{BE}$ is $I_C$. Equation (12), above, can be expressed as:

$$V_{BE} = K1 \times \ln \frac{I_C}{K2} \quad (13)$$

where K1 and K2 are constants.

Equation (13) can be summarized as:

$$V_{BE} \propto I_C \quad (14)$$

Expression (14) indicates that $V_{BE}$ is proportional to current $I_C$. Expression (14) may be given by:

$$\Delta V_{BE} \propto \Delta I \quad (15)$$

If current II is increased by ΔI, then base-to-emitter voltage $V_{BE}(Q1)$ of transistor Q1 is increased in proportion thereto.

In the entire operation of the circuit, the level variation in the video signal applied to input node N3 appears as a current variation of transistor Q1 by ΔI and sequentially affects transistors Q6, Q7 and Q2. Consequently, if current Q1 is increased by ΔI, then current Q2 is increased by ΔI and voltage $V_{BE}(Q^2)$ is increased in proportion to ΔI by $\Delta V_{BE}$. The variation is represented by equation (12). If $V_{BE}(Q1)$ is increased, since $V_{BE}(Q2)$ is increased and reference voltage V1 at reference voltage generating node N1 is also increased, then clamping output level $V_{OUT}=(V1-V_{BE}(Q1)+V_{BE}(Q^4))$ of equation (8) is maintained at a constant value. The voltage of node N3 is as follows:

$$V_{OUT}=V1+\Delta V_{BE}-\{V_{BE}(Q1)+\Delta V_{BE}\}+V_{BE}(Q4) \quad (16)$$

If $V_{BE}(Q1)$ is increased by $\Delta V_{BE}$, then the reference voltage V1 at reference voltage generating node N4 is also increased by $\Delta V_{BE}$. Therefore, voltage $V_{OUT}$ at node N3 may be more uniformly maintained at $V1-V_{BE}(Q1)+V_{BE}(Q4)$.

Figure 6:
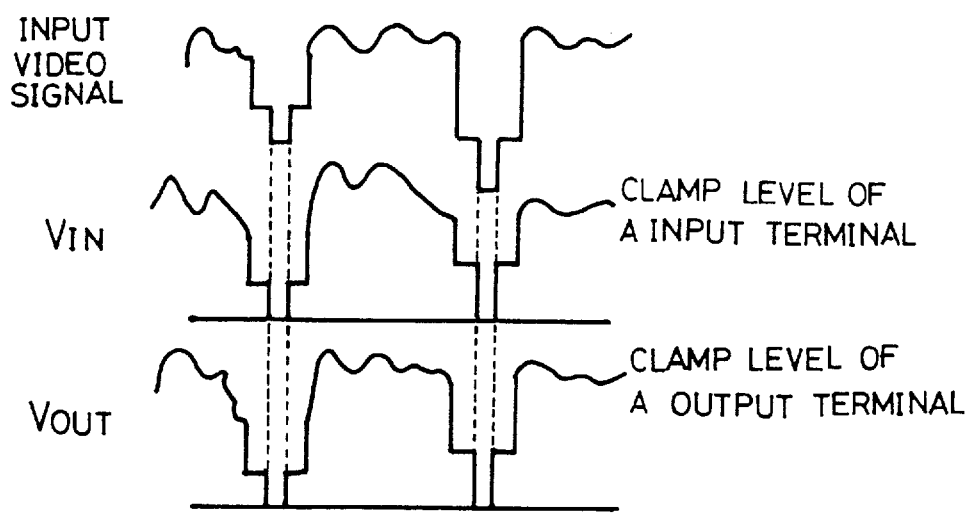
FIG. 6 is a waveform chart illustrating an operation of the video signal clamping circuit of FIG. 5.

Referring to FIG. 6, the clamping levels of input and output terminal waveforms for the input video signal having a varied peak level are maintained at a constant level. To obtain such an operation, it is important to match transistors Q1 and Q2 so as to have the same electrical characteristics. In an integrated circuit design, the electric characteristics of transistors Q1 and Q2 can be easily matched.

As described above, video signal clamping circuits in accordance with the present invention utilize a clamper, level variation detector and reference voltage compensator. The level variation detector senses a variation in the clamping level of the input and output terminals. If the peak level of the input video signal varies, then the reference voltage compensator compensates for the varied peak level so as to have a constant clamping output level. That is, video signal clamping circuits in accordance with the present invention include the level variation detector for sensing the variation in the peak level of the input video signal and the reference voltage compensator for compensating for the varied peak level, in addition to a general clamper. In a video signal processing circuit such as a television, video cassette recorder, etc., the peak level of the input video signal can be clamped to a constant level. Therefore, a signal level does not swing with the DC level and a more stable screen can be achieved. Further, the electrical characteristics of the transistors can be more easily matched by using an integrated circuit design.

Although various preferred embodiments of the present invention have been disclosed for illustrative purposes, those skilled in the art will appreciate that various modifications, additions and/or substitutions are possible without departing from the scope and spirit of the present invention as disclosed in the claim. It also is to be noted that the circuit equations and expressions are provided for explanation purposes, and such discussion is not to bound to any particular circuit theory or description.

What is claimed is:

1. A video signal clamping circuit for generating a clamping output level, comprising:
   a clamper for generating the clamping output level in response to a reference voltage, wherein the clamper is coupled to a condenser receiving a video signal and comprises a plurality of transistors;
   a level variation detector for sensing a variation in the clamping output level of the clamper and generating a level variation signal corresponding to the variation in the clamping output level; and
   a reference voltage compensator coupled to the level variation detector, wherein the reference voltage compensator receives the level variation signal and compensates the reference voltage of the clamper.

2. A video signal clamping circuit as set forth in claim 1, wherein the clamper comprises:
   a first transistor having a base coupled to a terminal of the condenser receiving the video signal, and having an emitter coupled to a constant current source, the first transistor generating a clamping voltage;
   a current mirror having second and third transistors, a collector of the third transistor and bases of the second and third transistors being coupled so as to have the same base-to-emitter voltage, emitters of the second and third transistors being coupled to a power reference voltage through first and second resistors, respectively, and a collector of the third transistor being coupled to a power supply voltage through a third resistor; and
   a fourth transistor having an emitter coupled to the collector of the second transistor and to the base of the first transistor, and having a base coupled to a reference voltage generating node.

3. A video signal clamping circuit as set forth in claim 1, wherein the level variation detector comprises:
   a fifth transistor having a collector and base coupled to a collector of a fourth transistor of the clamper, and having an emitter coupled to a power supply voltage through a fourth resistor.

4. A video signal clamping circuit as set forth in claim 1, wherein the reference voltage compensator comprises:
   a sixth transistor having a base coupled to a base and collector of a fifth transistor of the level variation detector, and having an emitter coupled to a power supply voltage through a fifth resistor; and
   a seventh transistor having a collector and base coupled to a collector of a sixth transistor.

5. A video signal clamping circuit as set forth in claim 2, wherein the second and third transistors have substantially the same electrical characteristics.

6. A video signal clamping circuit as set forth in claim 2, wherein the second and third transistors are manufactured in integrated form and have matched electrical characteristics.

7. A video signal clamping circuit as set forth in claim 2, wherein the first and second resistors are of substantially the same resistance.

8. A video signal clamping circuit as set forth in claim 1, further comprising a television coupled to receive the clamping output level.

9. A video signal clamping circuit as set forth in claim 1, further comprising a video cassette recorder coupled to receive the clamping output level.

10. A video signal clamping circuit for generating a clamping output level, comprising a clamper, a level variation detector, and a reference voltage compensator, wherein the clamper comprises:

a first transistor having a base coupled to a condenser receiving a video signal, and having an emitter connected to a constant current source, the first transistor generating a clamping voltage;

a current mirror having second and third transistors, a collector of the third transistor and bases of the second and third transistors being coupled so as to have a common base-to-emitter voltage, emitters of the second and third transistors being coupled to a power supply reference voltage through first and second resistors, the collector of the third transistor being coupled to a power supply voltage through a third resistor; and a fourth transistor having an emitter coupled to the collector of the second transistor and to the base of the first transistor, and having a base coupled to a reference voltage generating node, the level variation detector comprising:

a fifth transistor having a collector and base coupled to the collector of the fourth transistor of the clamper, and having an emitter coupled to the power supply voltage through a fourth resistor, the reference voltage compensator comprising:

a sixth transistor having a base coupled to the base and collector of the fifth transistor of the level variation detector, and having an emitter coupled to the power supply voltage through a fifth resistor; and a seventh transistor having a collector and base coupled to the collector of the sixth transistor.

11. A video signal clamping circuit as set forth in claim 10, wherein the fourth transistor of the clamper and the seventh transistor of the reference voltage compensator transmit a voltage variation and have matched electrical characteristics.

12. A video signal clamping circuit as set forth in claim 10, wherein the second and third transistors have substantially the same electrical characteristics.

13. A video signal clamping circuit as set forth in claim 10, wherein the second and third transistors are manufactured in integrated form and have matched electrical characteristics.

14. A video signal clamping circuit as set forth in claim 10, wherein the first and second resistors are of substantially the same resistance.

15. A video signal clamping circuit as set forth in claim 10, further comprising a television coupled to receive the clamping output level.

16. A video signal clamping circuit as set forth in claim 10, further comprising a video cassette recorder coupled to receive the clamping output level.

* * * * *

UNITED STATES PATENT AND TRADEMARK OFFICE
CERTIFICATE OF CORRECTION

PATENT NO. : 5,892,555
DATED : April 6, 1999
INVENTOR(S) : Ki Sung Sohn

It is certified that error appears in the above-identified patent and that said Letters Patent is hereby corrected as shown below:

Column 4, line 2, after "constant," insert --then--;

Column 4, line 11, after "constant," insert --then--.

Signed and Sealed this

Twenty-third Day of November, 1999

Attest:

Q. TODD DICKINSON

*Attesting Officer*      *Acting Commissioner of Patents and Trademarks*